(12) United States Patent
Nagaraja et al.

(10) Patent No.: US 11,991,282 B2
(45) Date of Patent: May 21, 2024

(54) DISTRIBUTED PRIVATE KEY RECOVERY

(71) Applicant: Visa International Service Association, San Francisco, CA (US)

(72) Inventors: Vinjith Nagaraja, Pflugerville, TX (US); Minghua Xu, Austin, TX (US); Karankumar Hiteshbhai Patel, Austin, TX (US); Shengfei Gu, San Francisco, CA (US); Sikhar Patranabis, San Francisco, CA (US); Saikrishna Badrinarayanan, Los Angeles, CA (US); Pratyay Mukherjee, Sunnyvale, CA (US); Peter Rindal, San Francisco, CA (US); Shan Jin, Austin, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 122 days.

(21) Appl. No.: 17/390,649

(22) Filed: Jul. 30, 2021

(65) Prior Publication Data

US 2023/0050481 A1    Feb. 16, 2023

(51) Int. Cl.
*H04L 9/08*   (2006.01)
*H04L 9/00*   (2022.01)
*H04L 9/32*   (2006.01)

(52) U.S. Cl.
CPC ............ *H04L 9/0897* (2013.01); *H04L 9/085* (2013.01); *H04L 9/3231* (2013.01);
(Continued)

(58) Field of Classification Search
CPC ..... H04L 9/0897; H04L 9/085; H04L 9/3231; H04L 9/50; H04L 9/0861; H04L 2209/08;
(Continued)

(56) References Cited

U.S. PATENT DOCUMENTS 10,033,803  B1 *  7/2018  Collins ................ G06F 9/5011
10,728,038  B2    7/2020  Tomlinson et al.
(Continued)

FOREIGN PATENT DOCUMENTS

KR    20190138384 A    12/2019

OTHER PUBLICATIONS

Aydar et al., "Private Key Encryption and Recovery in Blockchain", arXiv:1907.04156, 2019, 24 pages.
(Continued)

*Primary Examiner* — Shin-Hon (Eric) Chen
*Assistant Examiner* — Brian William Avery
(74) *Attorney, Agent, or Firm* — Kilpatrick Townsend & Stockton LLP

(57) ABSTRACT

A method performed by a user device is disclosed. The method comprising generating a secret and measuring a biometric template of a user operating the user device. The method then generates a plurality of secret shares of the secret and of the biometric template. The user device then transmits the secret shares of the secret and of the biometric template to a plurality of recovery devices. After, the user device may then initiate a recovery of the secret and measure a biometric measurement of the user. Data of the biometric measurement may be transmitted to the plurality of recovery devices, where the recovery devices perform a partial computation. The user device use the plurality of partial computations to determine a match between the biometric template and the biometric measurement. If the two biometrics match, the user device can reconstruct the secret using shares of the secret from the recovery devices.

20 Claims, 9 Drawing Sheets

(52) U.S. Cl.
CPC ............. *H04L 9/0861* (2013.01); *H04L 9/50* (2022.05); *H04L 2209/08* (2013.01)

(58) Field of Classification Search
CPC ... H04L 9/0643; H04L 9/0866; H04L 9/0894; H04L 9/3213; H04L 9/3218; H04L 2209/38
See application file for complete search history.

(56) References Cited

U.S. PATENT DOCUMENTS

| | | | | |
|---|---|---|---|---|
| 11,405,200 | B1* | 8/2022 | Hamel | H04L 9/0822 |
| 2017/0053110 | A1* | 2/2017 | Wang | G06F 9/4856 |
| 2017/0093576 | A1* | 3/2017 | Linnartz | G06V 40/70 |
| 2019/0342270 | A1* | 11/2019 | Laine | G06F 21/602 |
| 2020/0162243 | A1 | 5/2020 | Fletcher et al. | |
| 2020/0193410 | A1* | 6/2020 | Kaja | H04L 9/3231 |
| 2020/0228325 | A1* | 7/2020 | Fan | H04L 9/085 |
| 2020/0259638 | A1* | 8/2020 | Carmignani | H04L 9/50 |
| 2020/0285720 | A1* | 9/2020 | Alsolami | G06V 40/1353 |
| 2021/0182863 | A1* | 6/2021 | Doraiswamy | G06Q 20/02 |
| 2021/0194874 | A1* | 6/2021 | Herder, III | H04L 9/3231 |

OTHER PUBLICATIONS

Isler et al., "Distributed Single Password Protocol Framework", Computer Science, Mathematics, IACR Cryptol, 2018, 24 pages.
Application No. PCT/US2022/036528, International Search Report and the Written Opinion, dated Oct. 19, 2022, 8 pages.
Tran, "Cancellable Template Design and Application to Steganography", Available Online at: https://doi.org/10.26190/unsworks/20136, Aug. 2017, 52 pages.
Wang et al., "Weighted Polynomial-Based Secret Image Sharing Scheme with Lossless Recovery", Hindawi, Security and Communication Networks, vol. 2021, May 2021, 11 pages.

* cited by examiner

RECOVERY AGREEMENT
400

Key Holder ID: KEY_ID
Account Holder ID: ACC_ID
RecoveryEntityCounter: 3
RecoveryEntity1: (RE_ID1, 10)
RecoveryEntity2: (RE_ID2, 20)
RecoveryEntity3: (RE_ID3, 30)
TotalCostAmount: 65
Recovery Intent Token: RI_Token
Recovery Authorized Token: RA_Token

FIG. 4

DISTRIBUTED PRIVATE KEY RECOVERY

BACKGROUND

Users may use a secret (e.g., a private key) to access accounts. Meaning, if the secret is lost or forgotten by the user, they may no longer have access to their accounts. Many non-custodian wallets are implemented in a manner such that the secret never leaves the device. This provides security to the user's account as it is stored using a secure storage mechanism, however a problem arises if the user device is lost. There are no technical solutions available to retrieve the secret from a user device that cannot be accessed. There are methods of distributing a secret (e.g., amongst several devices) so that it may be reconstructed later. However, these techniques have not been used for account recovery. Additionally, such distributed reconstruction techniques may be vulnerable to attacks from a third party on a recovery device (e.g., an attack such as a brute force recovery attempt).

Embodiments of the disclosure address this problem and other problems individually and collectively.

SUMMARY

One embodiment of the invention includes a method performed by a user device. The method comprising: generating a secret that is used to access an electronic resource; measuring, by a sensor of the user device, a biometric template of a user operating the user device, the biometric template comprising a template vector; generating a plurality of secret shares of the secret; generating a plurality of biometric template shares of the biometric template; distributing, to each of a plurality of recovery devices, the plurality of secret shares of the secret and the plurality of biometric template shares of the biometric template; receiving a request to initiate a recovery of the secret; measuring, by the sensor of the user device, a biometric measurement of the user operating the user device, the biometric measurement comprising a measurement vector; transmitting data of the biometric measurement to each of the plurality of recovery devices; receiving, from a plurality of recovery devices, a plurality of partial computations; verifying the biometric template and the biometric measurement match using partial computations of the plurality of recovery devices, wherein the partial computations are determined using a comparison of plurality of biometric measurement shares to the plurality of biometric template shares; responsive to verifying the biometric template and the biometric measurement match, receiving the secret shares of the secret from the plurality of recovery devices; and reconstructing the secret using the secret shares.

Another embodiment includes a user device. The user device comprising: a processor; a plurality of biometric sensors; and a non-transitory computer readable medium comprising code executable by the processor to perform operations including: generating a secret that is used to access an electronic resource; measuring, by a sensor of the user device, a biometric template of a user operating the user device, the biometric template comprising a template vector; generating a plurality of secret shares of the secret; generating a plurality of biometric template shares of the biometric template; distributing, to each of a plurality of recovery devices, the plurality of secret shares of the secret and the plurality of biometric template shares of the biometric template; receiving a request to initiate a recovery of the secret; measuring, by the sensor of the user device, a biometric measurement of the user operating the user device, the biometric measurement comprising a measurement vector; transmitting data of the biometric measurement to each of the plurality of recovery devices; receiving, from a plurality of recovery devices, a plurality of partial computations; verifying the biometric template and the biometric measurement match using partial computations of the plurality of recovery devices, wherein the partial computations are determined using a comparison of plurality of biometric measurement shares to the plurality of biometric template shares; responsive to verifying the biometric template and the biometric measurement match, receiving the secret shares of the secret from the plurality of recovery devices; and reconstructing the secret using the secret shares.

A better understanding of the nature and advantages of embodiments of the invention may be gained with reference to the following detailed description and accompanying drawings.

BRIEF DESCRIPTION OF THE DRAWINGS

FIG. 4 shows pseudocode for data stored by a recovery agreement according to embodiments of the present invention.

TERMS

Figure 1:
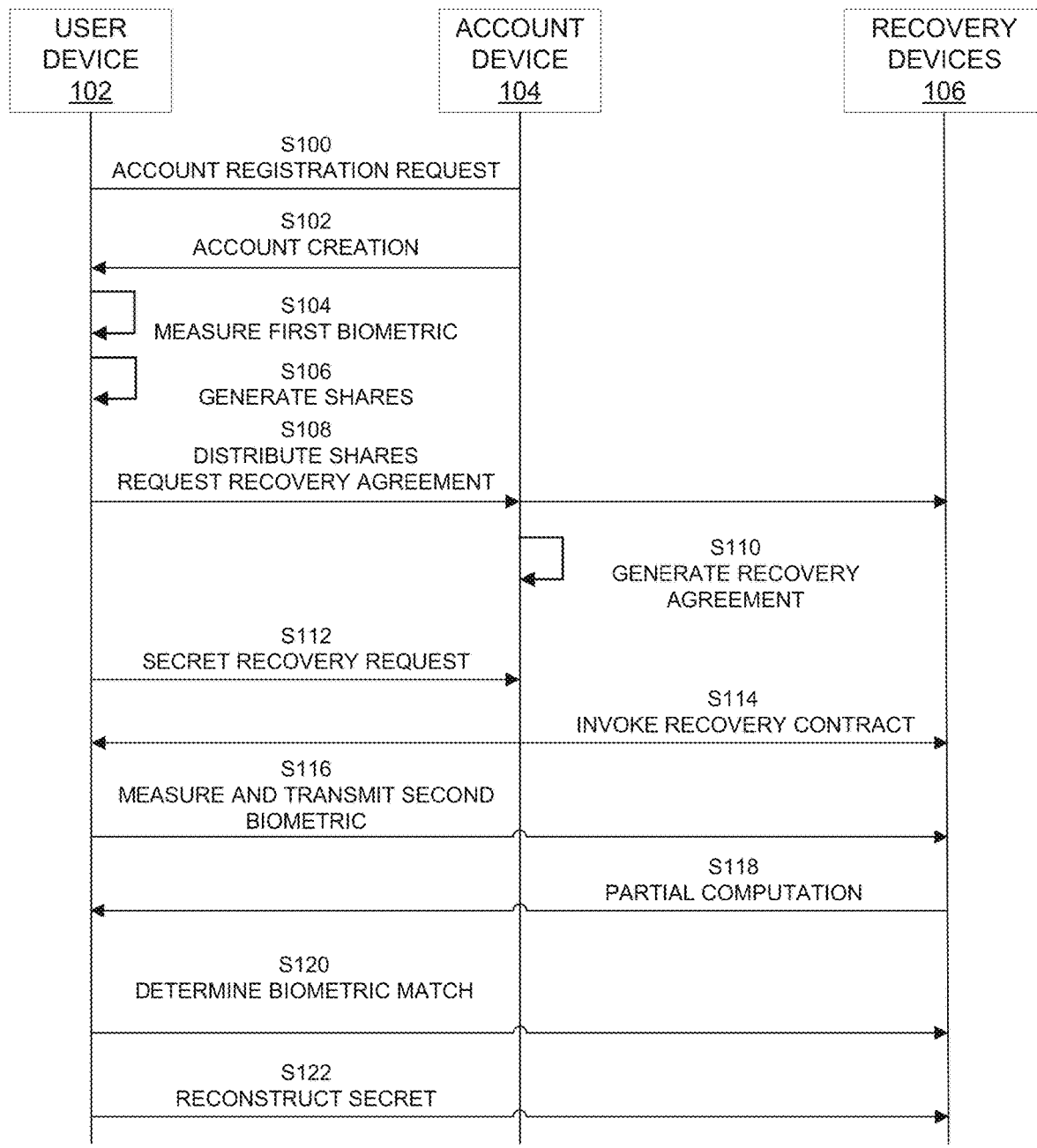
FIG. 1 shows a process flow for a user registering an account and recovering a secret in a distributed manner according to embodiments of the present invention.

Prior to discussing embodiments of the disclosure, some terms can be described in further detail.

A "secret" can be information that is not known or unseen by others. A secret may only be known to a user. For example, a PIN, password, biometric sample biometric template, or other data specific to and/or only known to a user may be a secret. A derivative of a secret may be information that is derived from the secret. For example, an encrypted secret or a secret that is concatenated with other information may be derivatives of a secret.

A "user" may include an individual or a computational device. In some embodiments, a user may be associated with one or more personal accounts and/or mobile devices. In some embodiments, the user may be an account holder.

A "user device" may be any suitable device that a user can interact with (e.g., a mobile phone, a laptop). User devices may be in any suitable form. Some examples of user devices include cellular phones, PDAs, personal computers (PCs), tablet computers, and the like. In some embodiments, where a user device is a mobile device, the mobile device may include a display, a memory, a processor, a computer-readable medium, and any other suitable component.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, handheld specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An "application" may be computer code or other data stored on a computer readable medium (e.g. memory element or secure element) that may be executable by a processor to complete a task.

A "threshold oblivious pseudorandom function (TOPRF)" may be a function that satisfies two properties, unpredictability (in function output) and obliviousness. A function meets the unpredictability property if it is difficult to predict the function's output when the function is applied to a random input value. A function meets the obliviousness property if the input value is difficult to guess when the output (e.g., the result of applying the function to the input value) is available.

An "electronic resource" may be a resource that is accessed via electronic means. For example, an electronic resource may be a computer, which has an account to accessed with or for a user device. The account may be a financial account, an email account, etc. The electronic resource may require a secret, such as a password or cryptographic key, to access.

DETAILED DESCRIPTION

A user may register an account with a service and/or resource provider such as a social media account, an email account, a bank account, a blockchain application, etc. The user may use a secret (e.g., a password or private key) to access the account. However, the user may lose or forget the secret and thus lose access to the account. A user may have options to recover the secret, for example, the secret may be stored in some form by the provider and provided to the user after an authentication process. In other cases, such as non-custodian wallets, the provider may not have access to the secret and thus the user will permanently lose access to their account. Embodiments of the disclosure allow for a user to store the secret via a plurality of recovery devices in a distributed manner, the secret may then be reconstructed at a later time. A recovery device may be operated by a trusted recovery entity (e.g., a government agency, an authorizing entity, a bank, a payment processing network, etc.).

In some embodiments, a user registering an account that requires a secret to access may choose any number of recovery entities operating a recovery device to store shares of the secret. A technique, such as Shamir's secret sharing, may be used to generate shares of a secret. The user may additionally choose a value amount to be assigned to each one of the plurality of recovery entities. The value amount may be an amount of any suitable resource such as a dollar amount, a computationally complex puzzle, etc. The value amount may be used as a weight to determine the relative size of the share of the secret to be stored by the recovery device. The generated shares of the secret may be transmitted to the respective recovery device. In some implementations, the user device may further transmit a key to be used for a pseudorandom function.

As part of establishing the recovery process, the user may measure a first biometric measurement using a user device. A biometric sensor of the user device (e.g., a camera, a microphone, a fingerprint sensor, etc.) may be used to measure a biometric feature of the user. For example, the user may use a camera of the user device to perform a facial scan of the user, or a fingerprint can be measured. The user device may generate a biometric template from the first biometric measurement. The biometric template may include a template vector comprising measured values of the set of biometric features of the user. For example, the user device may compute distances between facial features identified in the facial scan, and the corresponding template vector may comprise the computed distances. The user device may then generate shares of the biometric template (e.g., similarly to how the shares of the secret are generated) and transmit shares of the biometric template to the recovery entities. Each one of the plurality of recovery devices may then store the share of the biometric template received. In some embodiments, the shares of the biometric template and the shares of the secret may be transmitted to the recovery devices simultaneously. In other embodiments, the shares of the biometric template and the shares of the secret may be transmitted separately.

An account device may be used to facilitate the recovery of a secret via a recovery agreement, which can comprise any one or more of: an identifier associated with the account device, an identifier associated with the user device, the total number of recovery devices, the total value amount, a recovery intent token (e.g., an unauthorized token that is used by the recovery devices to approve a recovery request), and a recovery authorized token (e.g., an authorized token that is used to initiate the recovery). As another example, the recovery agreement can include: for each of the plurality of recovery devices, an identifier associated with the recovery device, the value amount assigned to the recovery device. The recovery agreement may be stored in an agreement database. The recovery agreement may be deployed after the relevant parties (e.g., computers pointed to by the identifiers in the recovery agreement) digitally sign the recovery agreement. In some embodiments, the account device may maintain a blockchain or a PKI based application.

The user may at any time after the recovery choose to invoke the recovery agreement. For example, the user device may transmit a recovery request to the account device, the recovery request comprising an identifier associated with the user device. After receiving the recovery request, the account device may retrieve the recovery agreement from the agreement database. The account device may retrieve the recovery intent token and transmit it to the plurality of recovery devices identified in the recovery agreement. The recovery intent token may be an unauthorized token, which is used by any of the relevant parties during a recovery phase to identify the recovery agreement and the status of the recovery request (e.g., the recovery intent token may identify the recovery was requested but has not yet been authorized). Each of the recovery devices may verify the recovery request (e.g., by verifying the identity of the user device) and transmit an approval message to the account device. After receiving approval from all of the plurality of recovery devices, the account device may retrieve the recovery authorized token from the recovery agreement and transmit it to the plurality of recovery devices, the agreement database, and the user device.

After receiving the recovery authorized token, the user device may prompt the user to measure a second biometric measurement. The measurement may be done in a similar manner to the first measurement. The second biometric measurement may be used to generate a measurement vector (e.g., a vector similar to the template vector). The user device may transmit to measurement vector to the plurality of recovery devices. Each one of the plurality of recovery devices may generate a partial computation with their share of the biometric template to be transmitted to the user device. For example, an inner product may be computed between the measurement vector and the share of the biometric template. The partial computation may be a computation to determine if the second biometric measurement and the biometric template match according to a distance measure, thus the partial computation itself may be a partial distance. The recovery devices may also generate and transmit a zero knowledge proof. After receiving a partial computation all of the recovery devices, the user device may determine if the measurement vector and the template vector match based on if a similarity measure (e.g., a cosine similarity) is under a threshold value. If the two vectors are determined to match, the user device may notify the plurality of recovery devices to receive the shares of the secret.

I. Overview of Recovering a Secret

FIG. 1 shows a process flow 100 for a user registering an account and recovering a secret in a distributed manner according to embodiments. A user operating a user device 102 may register an account and a secret used to access the account at an account device 104. The account device 104 may allow the user to store the secret and a first biometric measurement (e.g., a fingerprint, a facial scan, a voice recording, etc.), which will be used for authentication in a recovery step, in a distributed manner with a plurality of recovery devices 106. Only one of the recovery devices 106 is explicitly shown in the figure, however there may be a plurality of recovery devices which perform similar steps. At a later time, the user device 102 may recover the secret by providing a second biometric measurement that closely matches the first biometric measurement. FIG. 1 describes the process for the user registering an account, distributing the secret with a number of recovery entities, and recovering the secret.

In step S100, the user device 102 may send an account registration request to an account device 104. The user may generate a username and a secret that will be used to access the account after registration is complete. In some cases, the user may receive a cryptographic nonce as a response to the account registration request. The cryptographic nonce may be used in a signed data packet comprising the secret and a biometric template. The signed data packet, along with any additional information, may then be sent to the account device 104.

In step S102, the account device 104 may process the account registration request. The account device 104 may verify any information in the request (e.g., the uniqueness of the username provided, etc.) and create an account for the user. The account device 104 may notify the user device 102 on the creation of the account.

In step S104, the user device 102 may generate secret shares of the secret. For example, the user device 102 may use any suitable secret sharing technique to split the secret into n total shares of the secret to be shared with n total recovery devices 106. An example of a secret sharing technique may be Shamir's secret sharing. In some embodiments, the user device 102 may assign a value amount to each one of the recovery devices. The value amount may be a dollar amount. Further, in some embodiments, the value amount may be used to determine the relative size of the share of the secret. In some implementations, the secret shares may be generated such that a threshold number t<n of shares may be used to reconstruct the secret.

In step S106, the user operating the user device 102 may measure a first biometric measurement. For example, the user device 102 may use a camera of the user device 102 to perform a facial scan of the user. The user device 102 may generate a biometric template from the first biometric measurement. The biometric template may include a template vector comprising measured values of the set of biometric features of the user. For example, the user device 102 may computer distances between facial features identified in the facial scan and the corresponding template vector may comprise the computed distances. In some embodiments, the user device 102 may generate shares of the biometric template. The shares of the biometric template may be generated with a similar technique to the one used in step S104.

In step S108, the user device 102 may distribute the shares of the secret and the shares of the biometric template to the n total recovery devices 106. In some implementations, the user device 102 may first encrypt the shares of the secret and/or the shares of the biometric template before distribution. The user device 102 may directly distribute the shares of the secret and the shares of the biometric template, or may request the account device 104 to distribute the shares. In some embodiments, the user device 102 may transmit the value amount to the respective recovery device. Additionally, the user device 102 may transmit a message to the account device 104 to create a recovery agreement. The user device 102 may include an identifier associated with the user device 102, an identifier associated with the account device 104, the total number of recovery devices, the total value amount and, for each of the plurality of recovery devices, an identifier associated with the recovery device and the value amount assigned to the recovery device.

In step S110, the account device 104 may then generate a recovery agreement which comprises the data sent by the user device 102 in step S108, along with a recovery intent token and a recovery authorized token. The account device 104 may store the recovery agreement in a agreement database and request all devices indicated by the identifiers (e.g., the user device 102, the recovery devices 106) to digitally sign the recovery agreement. The recovery intent token may be used to authorize a recovery request initiated by the user device 102

In step S112, the user device 102 may generate a secret recovery request and transmit the request to the account device 104. The secret recovery request may comprise the identifier associated with the user device 102.

In step S114, the account device 104 may invoke the recovery agreement. For example, the account device 104 may retrieve the recovery intent token from the recovery agreement and transmit it to the user device 102 and the recovery devices 106. Each one of the recovery devices 106 may choose to approve or deny the secret recovery request. In some embodiments, the recovery devices 106 may determine if the value amount was provided by the user device 102 in step S108. After receiving approval from all of the recovery devices 106, the account device 104 may retrieve the recovery authorized token from the recovery agreement and transmit it to the user device 102 and the recovery devices 106.

In step S116, the user operating the user device 102 may measure a second biometric measurement. The user device 102 may measure the second biometric measurement in a similar manner to step S106. The user device 102 may generate a measurement vector (e.g., a vector similar to the template vector) from the second biometric measurement. The user device may transmit to measurement vector to the plurality of recovery devices.

In step S118, each one of the plurality of recovery devices 106 may generate a partial computation with their share of the biometric template. For example, an inner product may be computed between the measurement vector and the share of the biometric template. The partial computation may be a computation to determine if the share of the second biometric measurement and the biometric template match according to a distance measure, thus the partial computation itself may be a partial distance. The recovery devices 106 may also generate and transmit a zero knowledge proof along with the partial computation to the user device 102. After a partial computation is computed by all of the recovery devices 106, a match may be determined between the measurement vector and the template vector based on if a similarity measure (e.g., a cosine similarity) is under a threshold value.

In step S120, the user device 102 may generate a cryptographic program. The cryptographic program may use the set of partial computations to determine if the measurement vector and template vector match. In some implementations, the cryptographic program may include a garbled circuit. The garbled circuit may perform the steps of adding partial distances and comparing the total distance to the template. The user device 102 may input the measurement vector into the garbled circuit, and thus the measurement vector may be compared to the template vector without the user device 102 sending the measurement vector to the recovery devices 106. In other implementations, the cryptographic program may use properties of additively homomorphic encryption to determine if the measurement vector is within the threshold value of similarity. In yet other implementations, the cryptographic program may reconstruct the biometric template using the template shares.

In step S122, after determining the measurement vector and template vector match, the user device 102 may reconstruct the secret by requesting shares of the secret from the recovery devices 106. For example, the user device 102 may request shares of the secret from the recovery devices 106 then use the cryptographic program or the garbled circuit to compare the shares of the secret to the biometric measurement to determine if they match.

Further details will be discussed in the following description.

II. Recovery Registration

A user may have an account that requires a secret to access. In some embodiments, the secret may be stored securely on a user device operated by the user. While providing security against many third-party attacks attempting to access the user's account, the secret will be lost if the user can no longer access the user device.

A. Secret Registration

The registration phase (e.g., steps S104 through S110 of FIG. 1) will now be discussed in further detail with reference to FIG. 2. A user operating a user device may register/store a secret, used to access an account at an account device, with a plurality of recovery devices. The account device may generate a recovery agreement which contains all necessary data for the user to recover the secret at a later time. For example, the recovery agree may comprise identifiers associated with the recovery devices that hold shares of the secret and other routing information.

Figure 2:
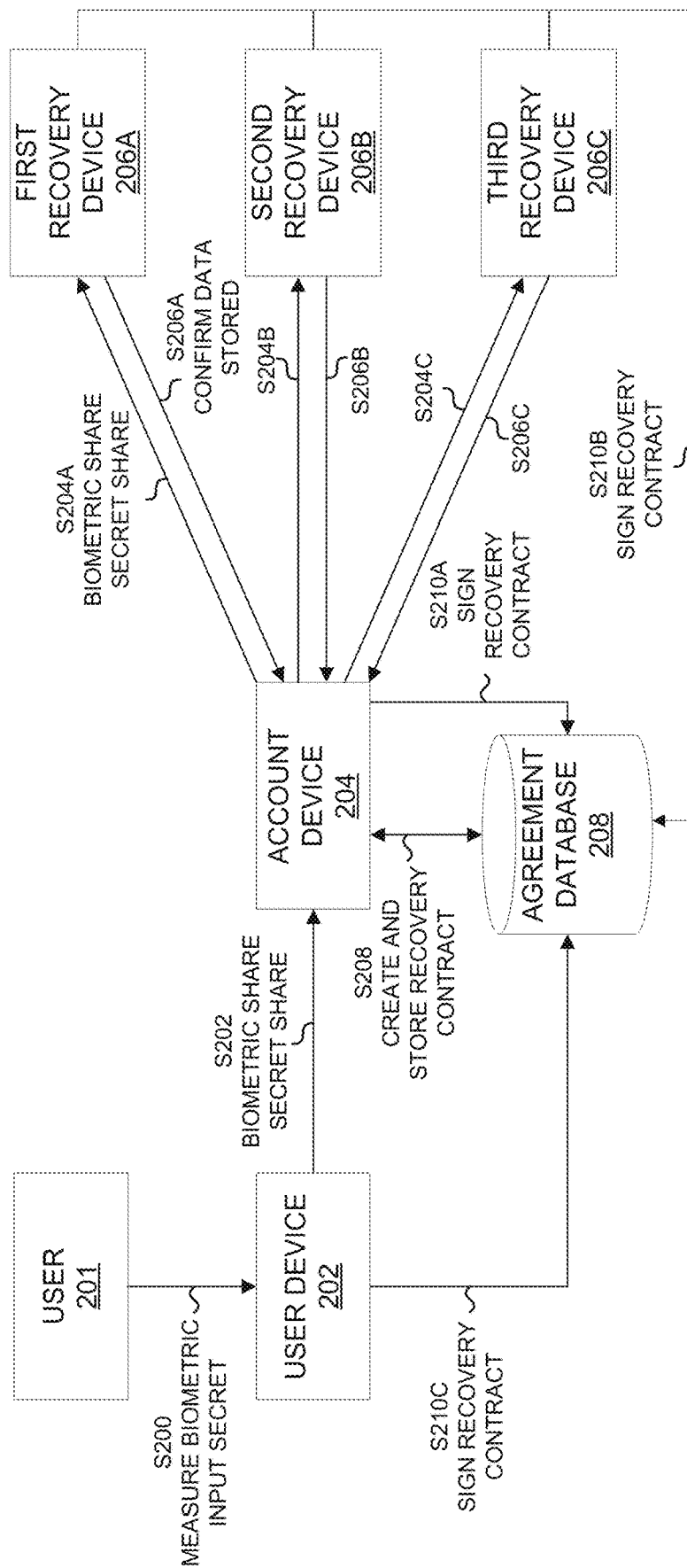
FIG. 2 shows a block diagram depicting a registration phase according to embodiments of the present invention.

FIG. 2 shows a block diagram 200 depicting a registration phase according to embodiments. A user 201 operating a user device 202 may wish to register a secret, used to access an account operated by an account device 204, to be distributed to a plurality of recovery devices 206A, 206B, and 206C. In this example, the user 201 has selected only three recovery devices to hold shares of the secret, however the user 201 may select any number of recovery devices.

In step S200, the user 201 may select a number of recovery entities to send shares of a secret and measure a biometric (e.g., a fingerprint) on the user device 202. A biometric sensor of the user device 202 (e.g., a camera, a microphone, a fingerprint sensor, etc.) may be used to measure a biometric feature of the user 201. For example, the user 201 may use a camera of the user device 202 to perform a facial scan of the user 201. In some embodiments, the user 201 may additionally input the secret on the user device 202. In some embodiments, the user 201 may also input a value amount (e.g., a dollar amount, a computational puzzle, etc.) to be associated with each one of the secret shares. In some embodiments, the value amount may correspond to the relative size of the secret share. For example, the user 201 may assign the first recovery device 206A a value amount of 10, the second recovery device 206B a value amount of 20, and the third recovery device 206C a value amount of 30. Following this example, in some embodiments, the first recovery device 206A may receive a share of the secret with a relative length of 10/60, the second recovery device 206B may receive a share of the secret with a relative length of 20/60, and the third recovery may receive a share of the secret with a relative length of 30/60.

In step S202, after measuring the biometric, and the user device 202 may generate a biometric template from the measured biometric. The biometric template may include a template vector comprising measured values of the set of biometric features of the user. For example, the user device 202 may compute distances between facial features identified in the facial scan and the corresponding template vector may comprise the computed distances.

The user device 202 may then generate three total shares of the secret using any suitable secret sharing technique such as Shamir's secret sharing. The number of shares of the secret generated may correspond to the total number of recovery devices (e.g., three shares of the secret, a first secret share $sk_A$, a second secret share $sk_B$, and a third secret share $sk_C$ may be generated for the system of FIG. 2). In some embodiments, the value amount may be used in the generation of the shares of the secret. The user device 202 may additionally generate shares of the biometric template in a similar manner. The user device 202 may send, to each recovery device 206A, 206B, and 206C, e.g., via the account device 204, one of the shares of the secret, the value amount associated with the share of the secret and one of the shares of the biometric template. Further, the user device 202 may transmit a list comprising an identifier associated with each one of the recovery devices to the account device 204. The value amount may be transmitted to the recovery devices for each recovery attempt. In some embodiments, the user device 202 may select a threshold lower than the total amount of recovery devices which will be required to reconstruct the secret and/or verify the biometric. For example, the user device 202 may specify a threshold number t of recovery devices which will be necessary to recover the secret. A threshold oblivious pseudorandom function (TOPRF) can be used such that, for a secret shared among a total n recovery devices, any threshold number t<n of recovery devices may be used to recover the secret but any number lower than the threshold number t cannot.

In some embodiments, the user device 202 may apply a secure sketch to the measured biometric to generate a password (e.g., a string representation of the biometric measurement). The user device 202 may hash the password. The user device 202 may then generate a hash portion $h_i$ of the hashed password to the recovery device (e.g., the hash portion $h_i$ may be generated raising the hashed password h(pwd) to the power of a share of the secret $sk_1$). Alternatively, the user device 202 may send a blinded hashed password to the recovery device 206i and receive a blinded hash portion (e.g., by first blinding the password then following the process of the hash portion) which may then be deblinded by the user device 202 into a hashed portion $h_i$ and sent back to the recovery device.

Steps S204A, 5204B, and 5204C may be performed by the account device 204 after receiving shares from the user device 202. For example, in step S204A, after receiving the relevant shares from the user device 202, the account device 204 may route the relevant data to the recovery device 206A. For example, the account device 204 may send a first share of the secret, a first value amount, and a share of the biometric template to the first recovery device 206A. In some embodiments, the user device 202 may directly transmit the data to the recovery devices. Steps S204B and 5204C may be steps performed by the account device 204 wherein data similar to that sent to the first recovery device 206A is sent to the second recovery device 206B or the third recovery device 206C.

Steps 206A, 5206B, and 5206C may be executed by a respective one of the recovery devices 206A, 206B, or 206C. For example, in step S206A, after receiving a share of the secret, a value amount, and a share of the biometric template, the first recovery device 206A may store the data. The share of the secret and/or the share of the biometric template may be stored in an encrypted form by the first recovery device 206A. In some embodiments, the first recovery device 206A may store the data is secure memory. After storing the data, the first recovery device 206A may send a notification to the account device 204, confirming it has stored the data necessary to execute a recovery agreement. A similar step may be performed by the second recovery device 206B and the third recovery device 206C.

In step S208, after receiving a notification from each of the recovery devices 206A, 206B, and 206C confirming the data necessary for a recovery agreement has been stored, the account device 204 may generate a recovery agreement. The recovery agreement may comprise an identifier associated with the user device 202, an identifier associated with the account device 204, the total number of recovery devices (e.g., three in the system of FIG. 2), an identifier associated with each of the plurality of recovery devices and their associated value amount, the total value amount, a recovery intent token, and a recovery authorized token. The recovery intent token and recovery authorized tokens may be used to facilitate a recovery request. The recovery agreement may be stored by the account device 204 in a agreement database 208. The agreement database 208 may be accessed at a later time to initiate a recovery attempt.

In step S210, after the recovery agreement is stored in the agreement database 208, the user device 202, the account device 204, and the plurality of recovery devices 206 may sign the recovery agreement. After all parties sign the recovery agreement, the recovery agreement may be valid for use in a recovery request.

B. Distribution of Shares

The recovery of a secret can be dependent on the distribution of the secret to a number of recovery devices. Additionally, the user may register a biometric, such as a fingerprint, of their choice during registration. The biometric may be split into shares (e.g., as separate encrypted (blinded) portions) and transmitted, along with the shares of the secret to the recovery devices. The biometric shares may be used at a later time, during an authentication phase of a recovery attempt, to verify the identity (e.g., a biometric measurement may be compared to the biometric shares and be said to match if the distance between them is less than a threshold) of the user in order to proceed with the recovery of the secret, by recovering the biometric. Both the shares of the secret and the shares of the biometric may be secret shared among a plurality of recovery devices using any suitable secret sharing method such as Shamir's secret sharing.

Figure 3:
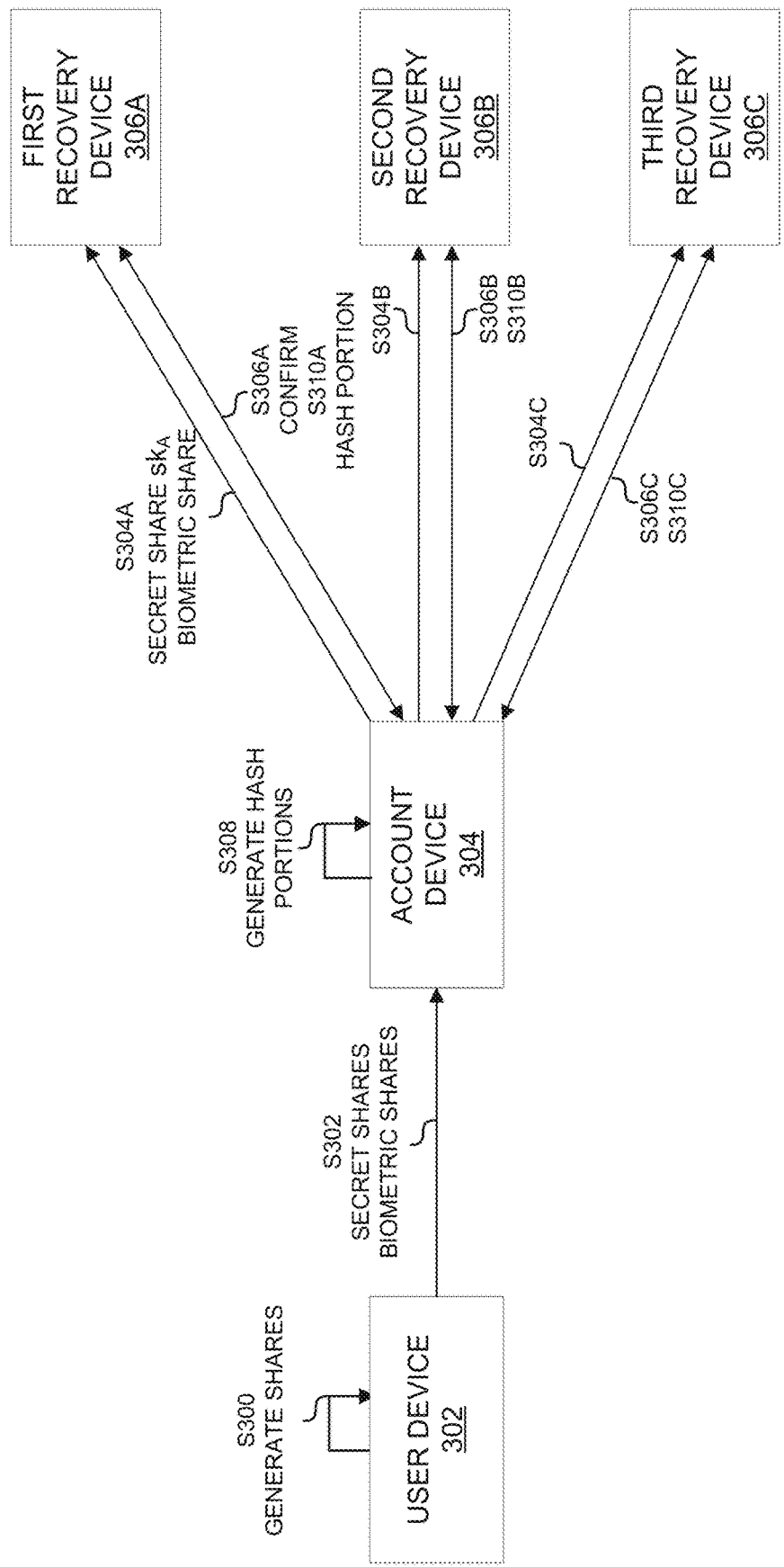
FIG. 3 shows a block diagram depicting a user device registering shares of a secret and a biometric template with a plurality of recovery devices.

FIG. 3 shows a block diagram depicting a user device 302 registering shares of a secret and a biometric template with a plurality of recovery devices. The user device 302 is assumed to hold a biometric measurement in the form of a biometric template (e.g., a template vector) and a secret. The process shown by FIG. 3 may be executed, for example, in S202-S206 of FIG. 2. Three recovery devices 306A, 306B, 306C are shown in FIG. 3, however, embodiments may comprise more or fewer devices associated with the user device 302.

In step S300, the user device 302 may generate shares of the secret and the biometric template, as well as any other parameters that might be needed for later authentication. For example, the user device 302 may generate secret shares $sk_A$, $sk_B$, $sk_C$, and biometric shares $K_1$, $K_2$, $K_3$, which may later correspond to a first recovery device 306A, a second recovery device 306B, and a third recovery device 306C. The shares of the secret and the biometric template may be generated using any secret sharing technique.

In some embodiments, the user device 302 applies a secure sketch to the biometric measurement w. The secure sketch may take as input a biometric measurement w and generate a password pwd (e.g., a string representation of the biometric measurement). The user device 302 may generate a hash h(pwd) of the password. In some implementations, the user device 302 may blind the hashed password h(pwd) to create a blinded hash of the hashed password h'(pwd). For example, the hashed password h(pwd) may be blinded by raising the hash to a power of a random value R (e.g., h'pwd)=h(pwd)$^R$). The user device 302 may generate a master key msk and master key shares $msk_A$, $msk_B$, $msk_C$ using a TOPRF setup function. The user device 302 can use an encoding function of the TOPRF to generate the blinded hash of the hashed password h'=TOPRF.Encode(w, rand) for some random number rand.

In step S302, the user device 302 may transmit an identifier associated with the user device 302, the shares of the secret, and the shares of the biometric template to the account device 304. In some embodiments, the user device 302 may take place of the account device 304 and directly transmit the shares to the recovery devices. In some embodiments, the user device 302 may additionally transmit a master key share, and/or value amount (e.g., the value amount inputted in step S200 of FIG. 2) to the recovery devices.

In steps S304A-C, the account device 302 may send shares of the secret, shares of the biometric template, and other parameters to each of a plurality of the recovery devices. Each of the recovery devices 306A, 306B, 306C, may store the share of the secret, the share of the biometric template, and the other parameters. For example, the account device 302 may transmit a first secret share $sk_A$, a first biometric share $K_1$, and a first value amount to the first recovery device 306A. The recovery device 306A, 306B, and 306C may or may not store the received information in secure storage.

In steps S306A-C, the recovery devices may confirm receipt of the relevant shares to the account device 304. Thus, for a particular identifier associated with a user device, a recovery device will store a share of the secret, and a share of the biometric template.

In some embodiments, the recovery device may generate a partial answer. For example, the first recovery device 306A may apply (e.g., raise to the power of) the secret share $sk_A$ to the blinded hash of the hashed password h'(pwd) to obtain a partial answer $p_A$=h'(pwd)$^{R*skA}$. The partial answer will be different for each recovery device, as the share of the secret held by each recovery device is different. The recovery device can use an evaluate function of a TOPRF to generate the partial answer. For example, if the blinded hash is h'=TOPRF.Encode(w, rand), a partial answer may be computed as $p_i$=TOPRF.Eval($msk_i$, h'). As a part of S306A-C, each recovery device may send the partial answer $p_i$ back to the user device 302.

In an optional step S308, for each partial answer received, the user device 302 processes and deblinds the received partial answer, obtaining a hash portion $h_i$ h(pwd)$^{ski}$. For example, for the partial answer $p_A$=h'(pwd)$^{R*skA}$ received from the first recovery device 306A, the user device 302 removes R by raising the partial answer to the power of the inverse of R, thereby obtaining a hash portion $h_A$=h(pwd)$^{skA}$. The hash portion $h_A$ may be an example of a share of the secret and the biometric template. When the partial answer is computed using a TOPRF, the hash portion can be computed according to $h_i$=Hash(TOPRF.Combine(w, {i, $p_i$}, rand)). The hash portion may be referred to as a key, with the different keys sent to each of the recovery devices.

In steps S310A-C, the user device 302 may send the hash portion $h_i$ to the corresponding recovery device $306_i$. For example, the user device 302 may send the hash portion $h_A$ to the first recovery device 306A.

1. Secret Sharing

Sensitive user data such as a secret or a biometric may be split into shares, such as in step S300 of FIG. 3, to be securely stored by recovery devices. In such a case, user data (e.g., a secret, a biometric, etc.) may be separated into shares that can be distributed without directly revealing the user data. Possessing a sufficient amount of the shares of the user data may enable the user data to be reconstructed from the shares.

Shamir's secret sharing can refer to a way to generate shares of a secret so that a threshold number of the shares (e.g., the threshold number of shares chosen in step S202 of FIG. 2) are sufficient to reconstruct the secret, while any smaller number hides it completely. For instance, let Gen-Share be an algorithm that takes inputs p,n,t, $\{(i, \alpha_i)\}_{i \in S}$ s.t. t≤n<p, p is prime, S⊆[0,n] and |S|<t. It picks a random polynomial f of degree t−1 over $Z_p$ s. t. f(i)=$\alpha_i$ for all i ∈ S, and outputs f(0), f(1), . . . , f(n).

To generate a (t,n)-Shamir sharing of a secret s ∈ Zp, GenShare is given p,n, t and (0, s) as inputs to produce shares $s_0$, $s_1$, . . . , sn. Using the shorthand defined above, one can write the output compactly as ⟦ s ⟧ . Given any t or more of the shares, say $\{s_j\}_{j \in}$T for |T|≥t, one can efficiently find coefficients $\{\lambda_j\}_{j \in}$T such that s=f(0)=$\Sigma_{j \in}$T $\lambda_j$•sj. However, knowledge of up to t−1 shares reveals no information about s if it is chosen at random from $Z_p$.

2. Threshold Oblivious Pseudo-Random Function

A threshold oblivious pseudo-random function (TOPRF) may be used in generation of shares. A pseudo-random function (PRF) family is a keyed family of deterministic functions. A function chosen at random from the family is indistinguishable from a random function. Oblivious PRF (OPRF) is an extension of PRF to a two-party setting where a server S holds the key and a party P holds an input. S can help P in computing the PRF value on the input but in doing so P should not get any other information and S should not learn P's input. A threshold oblivious pseudo-random function (TOPRF) is a further extension on this, which naturally satisfies the two properties of obliviousness and unpredictability.

In particular, a TOPRF may be referred to as an (X, $\mathcal{R}$ )-threshold oblivious pseudo-random function (TOPRF) TOP, which is a tuple of four PPT algorithms, (Setup, Encode, Eval, Combine):

Setup($1^K$, n, t)→(sk, pp). This algorithm generates n secret key shares $sk_1$, $sk_2$, . . . , $sk_n$ and public parameters pp. Share $sk_i$ is given to party i.

Encode(x, ρ)=: c. This algorithm generates an encoding c of x ∈ X using randomness ρ∈$\mathcal{R}$ .

Eval($sk_i$, c)→$z_i$. This algorithm generates shares of TOPRF value from an encoding. Party i computes the i-th share $z_i$ from c by running Eval with $sk_i$ and c.

Combine(x, $\{(i, z_i)\}_{i \in S}$, ρ)=:h/⊥. This algorithm combines the shares received from parties in the set S using randomness p to generate a value h. If the algorithm fails, its output is denoted by ⊥.

With a TOPRF, irrespective of the randomness used to encode an x and the set of parties whose shares are combined, the output of the Combine algorithm does not change (as long as the Combine algorithm is given the same randomness used for encoding). More specifically, for all K ∈ ℕ , any n, t ∈ ℕ such that t≤n, all (sk, pp) generated by Setup($1^K$, n, t), any value x ∈ X, any randomness ρ, ρ' ∈$\mathcal{R}$ , and any two sets S, S'⊆[n] of size at least t, if c: =Encode(x, ρ), c': =Encode(x, ρ'), $z_i$←Eval($sk_i$, c) for i ∈ S, and $z'_i$←Eval($sk_j$, c') for j ∈ S', then Combine(x, $\{(i, z_i)\}_{i \in S}$, ρ)=Combine(x, $\{(j, z'_j)\}_{j \in S'}$, ρ')≠⊥.

This feature enables the shares of a data item to be combined into a complete data item, and the output of the Combine algorithm may be referred to as the output of the TOPRF on x, and denoted by TOP(sk, x).

The Combine algorithm could be broken into two separate algorithms, PubCombine and Decode. PubCombine can be run by anyone with access to just the partial evaluations $z_i$; it outputs an encoded PRF value z'. Decode can either be the same as Combine or it could take (x, z', p) as inputs. Since any $x \in X$, $\rho \in \mathcal{R}$, $S \subseteq [n]$ of size at least t, if c: =Encode(x, p) and $z_i \leftarrow$ Eval($sk_i$, c) for $i \in S$, then PubCombine($\{(i, z_i)\}_{i \in S}$) $\neq$ PubCombine($\{(i, z'_i)\}_{i \in S}$) if $z'_i \neq z_i$ for any i. This means that if any of the partial evaluations are tampered with, then PubCombine may be used to detect that.

A TOPRF protocol may be UC-secure under the Gap Threshold One-More Diffie-Hellman (Gap-TOMDH) assumption in the random oracle model and that Gap-TOMDH is hard in the generic group model.

This hardness can be assumed. Let U be the set of binary vectors of length n. The weight of a vector $u \in U$ is the number of 1s in it. Let t', $t \in N$ s.t. t'<t≤n. Define $MAX_{t',t}$ ($q_1, \ldots, q_n$) to be the largest value of $\ell$ s.t. $\exists u_1, \ldots, u_\ell \in U$ of weight t–t' s.t. ($q_1, \ldots, q_n$)–$\Sigma_{i \in [\ell]} u_i \geq 0$. (All operations on vectors are defined component-wise.)

C. Recovery Agreement

FIG. 4 shows pseudocode for data stored by a recovery agreement 400 according to embodiments. The recovery agreement holds all necessary data for a user to recover a secret. With reference to the example shown in FIG. 2, the recovery agreement 400 may store an identifier associated with the user device 202, an identifier associated with the account device 204, the total number of recovery devices of three, an identifier associated with the first recovery device 206A and its associated value amount of 10, an identifier associated with the second recovery device 206B and its associated value amount of 20, an identifier associated with the third recovery device 206C and its associated value amount of 30, the total value amount of 60, a recovery intent token, and a recovery authorized token.

The recovery intent token may be an unauthorized token. The recovery intent token may be used by any of the relevant parties during a recovery phase to identify the recovery agreement and the status of the recovery request (e.g., the recovery intent token may identify the recovery was requested but has not yet been authorized). The recovery authorized token may be used by the user device and the recovery devices to initiate the recovery of the secret.

The recovery agreement 400 may be deployed on a blockchain maintained by an account device. The user may be able to call the recovery agreement 400 directly from the blockchain. The user may be able to transmit the value amount (e.g., a cryptocurrency amount) to the recovery device via the blockchain in step S204. The recovery device may thus verify the value amount was transmitted in S206. The blockchain may allow the user to transmit the value amount for each recovery attempt. For example, in order to transmit the recovery intent token, the blockchain may require the user device to transmit the value amount to the recovery device.

III. Recovery Request

A recovery agreement may be invoked by a user wishing to recover the secret associated with the recovery agreement. The user may first generate, via their user device, a recovery request to be sent to the account device. The recovery request must first be approved by the account device and the recovery devices which hold shares of the secret. For example, the user may provide identity information, which may be verified by the account device and the recovery devices. After the user has been verified by all relevant devices, the account device may approve the recovery request, allowing the user device to proceed with recovering the secret.

Figure 5:
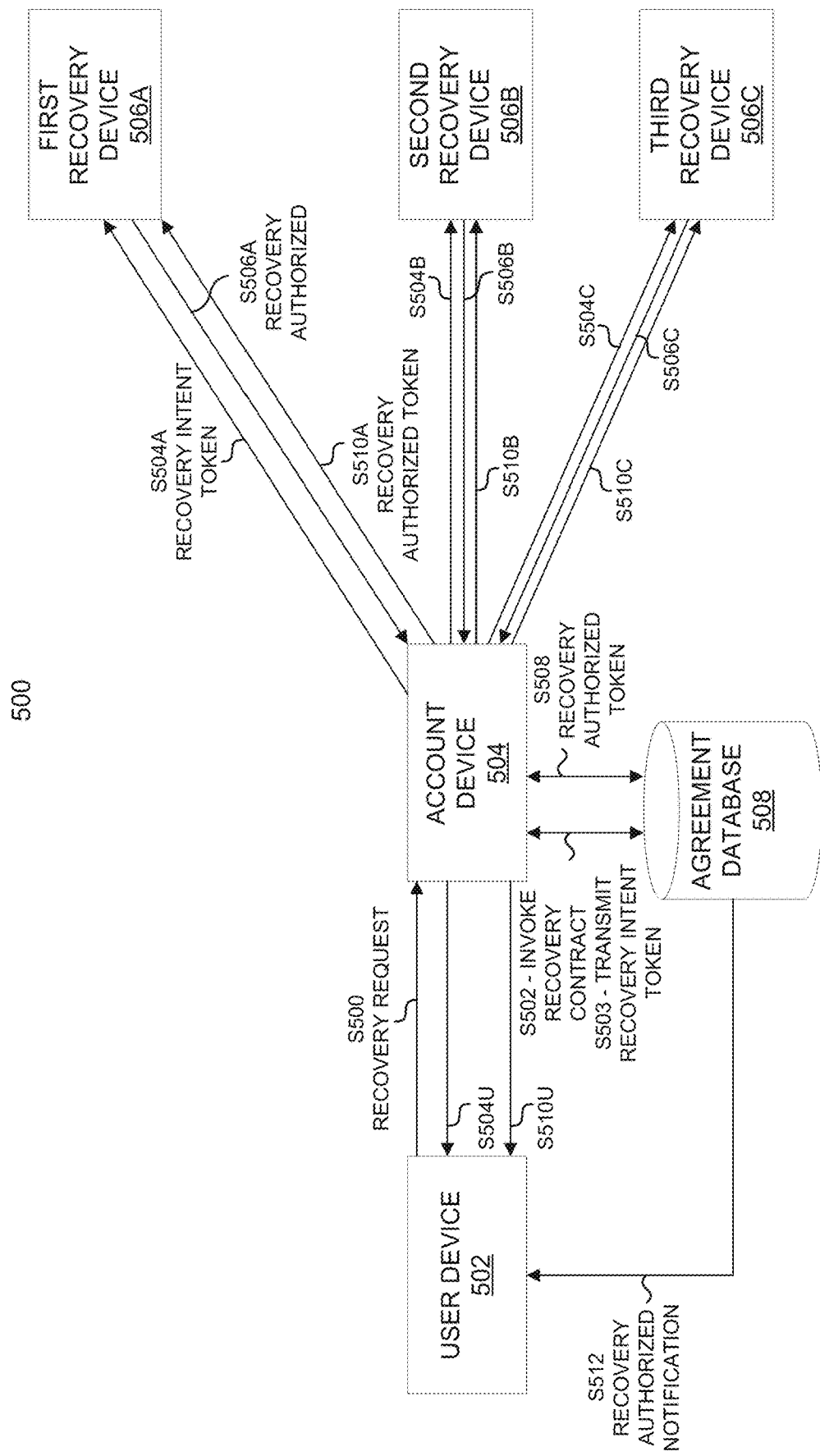
FIG. 5 shows a block diagram depicting a recovery request according to embodiments of the present invention.

FIG. 5 shows a block diagram 500 depicting a recovery request according to embodiments. A user may lose a secret that was registered in the process of FIG. 2. The user may use the value amount provided to the recovery devices during registration to initiate a recovery attempt for the secret. This provides security against a brute force attempt by a third party to recover the secret.

In step S500, any time after the recovery agreement was signed, the user operating the user device 502 can generate and send a recovery request to the account device 504. The recovery request may comprise an identifier associated with the user operating the user device 502. For example, the identifier may be a serial number, an email address, a government issued identifier, an IP address, a username, or any other suitable identifier, which may be unique to a user.

In step S502, as a response to receiving a recovery request, the account device 504 may access an agreement database 508 to invoke a recovery agreement associated with the identifier provided by the user device 502.

In step S503, as a response to a recovery agreement being invoked, the agreement database 508 sends the recovery intent token included in the recovery agreement to the account device 504.

In steps S504A-C and 504U, the account device 504 may send the recovery intent token and partial contract data to each of the recovery devices 506A, 506B, 506C and the user device 502. For example, in step S504A the account device 504 may send the first recovery device 506A the recovery intent token, the identifier associated with the user device 502, the identifier associated with the account device 504, the identifier associated with the first recovery device 506A, and the value amount associated with the first recovery device 506A.

In steps S506A-C, each of the plurality of recovery devices may authenticate the recovery intent token received and provide the value amount to the account device 504. For example, in step S506A, the first recovery device 506A may validate the user device 502 that they are able to or have provided the value amount. The first recovery device 506A may additionally check the value amount is provided for the request indicated by the recovery intent token. In some embodiments, the value amount may be a dollar amount to be paid per recovery attempt. For example, the recovery device 506A may check an account associated with the user device 502 for the dollar amount. A similar step may be taken by the second recovery device 506B and the third recovery device 506C.

In step S508, after receiving authentication from the plurality of recovery devices, the account device 504 may retrieve the recovery authorized token from the agreement database 508 (e.g., similarly to how the recovery intent token was retrieved).

In steps S510A-C and 510U, after retrieving the recovery authorized token, the account device 504 may transmit the recovery authorized token to the plurality of recovery devices 506A, 506B, 506C, and the user device 502.

In step S512, after providing the recovery authorized token to the account device 504, the agreement database 508 may send a recovery authorized notification to the user device 502, notifying the user operating the user device 502 that a recovery attempt using the recovery authorized token is allowed to be made. After the user device 504 receives the recovery authorized notification, the user may communicate with the recovery devices 506A, 506B, and 506C to begin to recover the secret.

IV. Biometric Authentication

After a recovery request is authorized, a user may begin to recover the secret. The recovery of the secret can comprise an initial biometric authentication, ensuring that the user performing the recovery of the secret is the same as the user who registered the secret. The biometric authentication may be performed by comparing a biometric measured at the time of the recovery request to the biometric that is stored by the plurality recovery devices.

A. Multi-Party Computation

Figure 6:
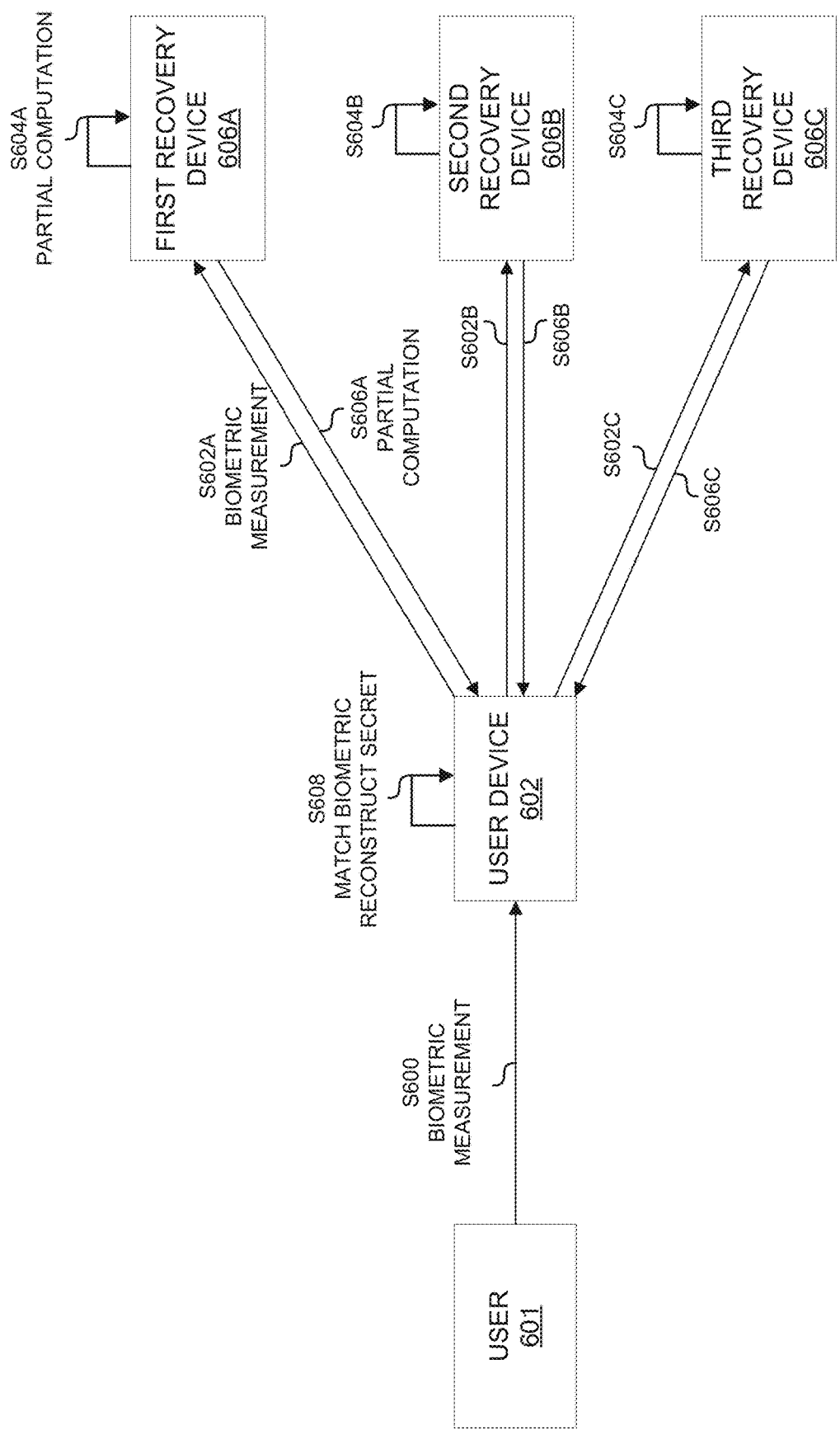
FIG. 6 shows a block diagram depicting a biometric authentication using multiparty computation according to embodiments of the present invention.

FIG. 6 shows a block diagram depicting a biometric authentication using multiparty computation according to embodiments of the present invention. One technique to perform a multiparty computation is described, however another similar technique for multiparty computation may be used. After receiving a recovery authorized token/notification, the user may begin recovery of the secret. The authentication may be done by comparing a new biometric measurement to the shares of the biometric template provided to the recovery devices during the registration phase described in FIG. 2.

In step S600, the user 601 measures a biometric using the user device 602. The biometric measurement may be the same type of biometric measured during the registration phase in step S200. A biometric sensor of the user device 602 (e.g., a camera, a microphone, a fingerprint sensor, etc.) may be used to measure a biometric feature of the user. For example, the user may use a camera of the user device 602 to perform a facial scan of the user. The user device 602 may generate a measurement vector from the first biometric measurement. The measurement vector comprising measured values of the set of biometric features of the user. For example, the user device 602 may compute distances between facial features identified in the facial scan and the corresponding measurement vector may comprise the computed distances.

In step S602, the user device 602 may encrypt the measurement vector and transmit the encrypted measurement vector to the plurality of recovery devices 606A, 606B, and 606C. In some implementations, the user device 602 may mask the measurement vector by applying a secure sketch to the measurement vector to generate a password (e.g., as a vector), then the resultant password may be hashed and raised to the power of a random value R, wherein the random value R is the same random value seen in step S300 of FIG. 3. The user device 602 may instead generate shares of the measurement vector (e.g., with a method similar to the generation of shares of the secret in step S202 of FIG. 2).

In step S604, each one of the plurality of recovery devices may compare the encrypted measurement vector or the shares of the measurement vector to a stored share of the biometric template. Each recovery device may perform a partial computation on the biometric measurement and the share of the biometric template. The partial computations can be computations to determine if the template and measurement match according to a pre-established distance measure. For example, the first recovery device 606A may compute an inner product between the share of the biometric template and the measurement vector. In some embodiments, the partial computation may be a distance measure between the share of the biometric template and the measurement vector. In some embodiments, the recovery devices may generate a zero knowledge proof for the partial computation. The partial distances may be encrypted with an additively homomorphic encryption scheme, which may be a threshold fully homomorphic encryption (TFHE) scheme. The TFHE can allow the recovery devices 608A, 608B, and 608C to compute the partial computations with both additions and multiplications of encrypted values, without decrypting the values. The partial computation may be partially decrypted.

In step S606, each one of the plurality of recovery devices 608A, 608B, and 608C may transmit their partial computations to the user device 602. The recovery devices may additionally transmit a zero knowledge proof for the partial computation.

In step S608, after receiving partial computations from each of the recovery devices, the user device 602 may compare the biometric measurement to the biometric template. The user device 602 may add partial computations (e.g., compute the total distance between the biometric template and the measurement vector as determined by a distance measure such as a cosine similarity or Hamming distance) to determine if the two match. For example, the user device 602 may compare the total distance between the biometric template and the measurement vector to a threshold, and if the total distance is less than the threshold, the biometric may be verified. If received, the zero knowledge proof may be used by the recovery devices to verify the comparison of the total distance to the threshold.

As a part of step S608, the user device 102 may generate a cryptographic program. The cryptographic program may use the set of partial computations to determine if the measurement vector and template vector match. The cryptographic program may include a garbled circuit. The garbled circuit may perform the steps of adding partial distances and comparing the total distance to the template. The user device 602 may input the measurement vector into the garbled circuit, and thus the measurement vector may be compared to the template vector without the user device 602 sending the measurement vector (or shares of the measurement vector) to the plurality of recovery devices 606. The cryptographic program may use properties of additively homomorphic encryption to determine if the measurement vector is within the threshold value of similarity. In some embodiments, the cryptographic program may reconstruct the biometric template using the template shares.

After verifying the biometric template and the biometric measurement match, the user device 602 may begin to reconstruct the secret. For example, the user device 602 may request the shares of the secret from each of the recovery devices and after receiving them (or a threshold amount of shares), the user device 602 may reconstruct the secret. To facilitate a secure exchange of shares of the secret, a process such as AES-256 may be performed, and the secret shares may be transmitted via an encrypted channel such as a hypertext transfer protocol secure (HTTPS) channel.

1. Distance Measures

Several distances measures may be used to determine if the biometric measurement vector and the biometric template vector match. As a preliminary, the $L^2$ norm of a vector $\vec{x} = (\vec{x}_1, \ldots, \vec{x}_n)$ is defined to be $$\|\vec{x}\| = \sqrt{\vec{x}_1^2 + \cdots + \vec{x}_n^2}.$$

Three distance measures are described that may be used in steps such as S608 of FIG. 6 to determine if a measurement vector and template vector match.

The Hamming distance of two vectors $\vec{u}=(\vec{u}_1, \ldots, \vec{u}_\ell)$ and $\vec{w}=(\vec{w}_1, \ldots, \vec{u}_\ell) \in \mathbb{Z}_q^\ell$, is defined to be the number of positions j at which $\vec{u}_j \neq \vec{w}_j$. The Hamming distance counts the number of points in which the measurement vector and template vector differ. Two vectors of length 1 each can be said to be close if their Hamming Distance is at most (l–d)—that is, they are equal on at least d positions, where d is serves the purpose of a threshold.

The cosine similarity for any two vectors $\vec{u}, \vec{w} \in \mathbb{Z}_q^\ell$ is define as $$CS.Dist(\vec{u}, \vec{w}) = \frac{\langle \vec{u}, \vec{w} \rangle}{\|\vec{u}\| \cdot \|\vec{w}\|}.$$

Cosine similarity uses the inner product of two vectors to determine the cosine of the angle between the vectors. Smaller angles correspond to more similar vectors. Thus if the angle is small, the cosine of the angle is greater, and if the cosine distance is greater than an established threshold, then the vectors are said to match.

The Euclidean distance for any two vectors $\vec{u}, \vec{w} \in \mathbb{Z}_q^\ell$ is defined as EC. $Dist(\vec{u}, \vec{w}) = (\langle \vec{u}, \vec{u} \rangle + \langle \vec{w}, \vec{w} \rangle - 2 \cdot CS.Dist(\vec{u}, \vec{w}))$. Euclidean distance measures the distance between the endpoints of two vectors are points in space. Two vectors that have a small Euclidean distance are closer together, thus if the Euclidean distance is below an established threshold, the vectors are said to match.

2. Threshold Fully Homomorphic Encryption

Partial computations performed by a plurality of recover devices may be combined using a Threshold Fully Homomorphic Encryption (TFHE) scheme. As in a standard HFE scheme, the TFHE scheme must be compact, correct, and secure and are defined informally as follows. The TFHE scheme is said to be compact if the bit-length of a ciphertext output by the evaluation algorithm and the bit-length of any partial decryption of such a ciphertext is apriori upper bounded by some fixed polynomial, which is independent of the size of the circuit evaluated. The TFHE scheme is said to provide semantic security if a probabilistic polynomial time (PPT) adversary cannot efficiently distinguish between encryptions of arbitrarily chosen plaintext messages $\mu_0$ and $\mu_1$, even given the secret key shares corresponding to a subset $\mathcal{S}$ of the parties, so long as $\mathcal{S}$ is an invalid access structure set. Simulation security of the TFHE scheme exist if there is an efficient algorithm TFHE. Sim that takes as input a circuit C of depth at most d, a set of ciphertexts $ct_1, \ldots, ct_k$, and the output of C on the corresponding plaintexts, and outputs a set of partial decryptions corresponding to some subset of parties, such that its output is computationally indistinguishable from the output of a real algorithm that homomorphically evaluates the circuit C on the ciphertexts $ct_1, \ldots, ct_k$ and outputs partial decryptions using the corresponding secret key shares for the same subset of parties. In particular, the computational indistinguishability holds even when a PPT adversary is given the secret key shares corresponding to a subset $\mathcal{S}$ of the parties, so long as $\mathcal{S}$ is an invalid access structure set.

Let $\mathcal{P} = \{\mathcal{P}_1, \ldots, \mathcal{P}_n\}$ be a set of parties and let $\mathbb{S}$ be a class of efficient access structures on $\mathcal{P}$. A TFHE scheme for $\mathbb{S}$ is a tuple of PPT algorithms TFHE=(TFHE. Gen, TFHE. Enc, TFHE. PartialDec, TFHE. Eval, TFHE. Combine) with the following properties:

TFHE. Gen($1^\lambda$, $1^d$, $\mathbb{A}$): On input the security parameter $\lambda$, a depth bound d, and an access structure $\mathbb{A} \in \mathbb{S}$, the setup algorithm outputs a public key $pk^{TFHE}$, and a set of secret key shares $sk_1^{TFHE}, \ldots sk_n^{TFHE}$.

TFHE. Enc($pk^{TFHE}, \mu$): On input a public key $pk^{TFHE}$, and a plaintext $\mu$, the encryption algorithm outputs a ciphertext ct.

TFHE. Eval($pk^{TFHE}$, C, $ct_1, \ldots, ct_k$): On input a public key $pk^{TFHE}$, a circuit C of depth at most d, and a set of ciphertexts $ct_1, \ldots, ct_k$, the evaluation algorithm outputs a cipehrtext ct*.

TFHE. PartialDec($sk_i^{TFHE}$, ct): On input a a secret key share $sk_i^{TFHE}$ and a ciphertext ct, the partial decryption algorithm outputs a partial decryption $\mu_i$.

TFHE. Combine (pk, $\{\mu_i\}_{i \in \mathcal{S}}$): On input a public key pk and a set of partial decryptions $\{\mu_i\}_{i \in \mathcal{S}}$ for some subset $\mathcal{S} \subseteq \{\mathcal{P}_1, \ldots, \mathcal{P}_n\}$, the combination algorithm either outputs a plaintext $\mu$ or the symbol $\perp$.

B. Secure Sketch and TOPRF

Another approach to authenticate the user is through a secure sketch and a TOPRF. In this embodiment, during registration, the recovery devices store a hash portion $h_i$ (described in FIG. 3), with the hash portion being stored based on an identifier associated with a user device.

Figure 7:
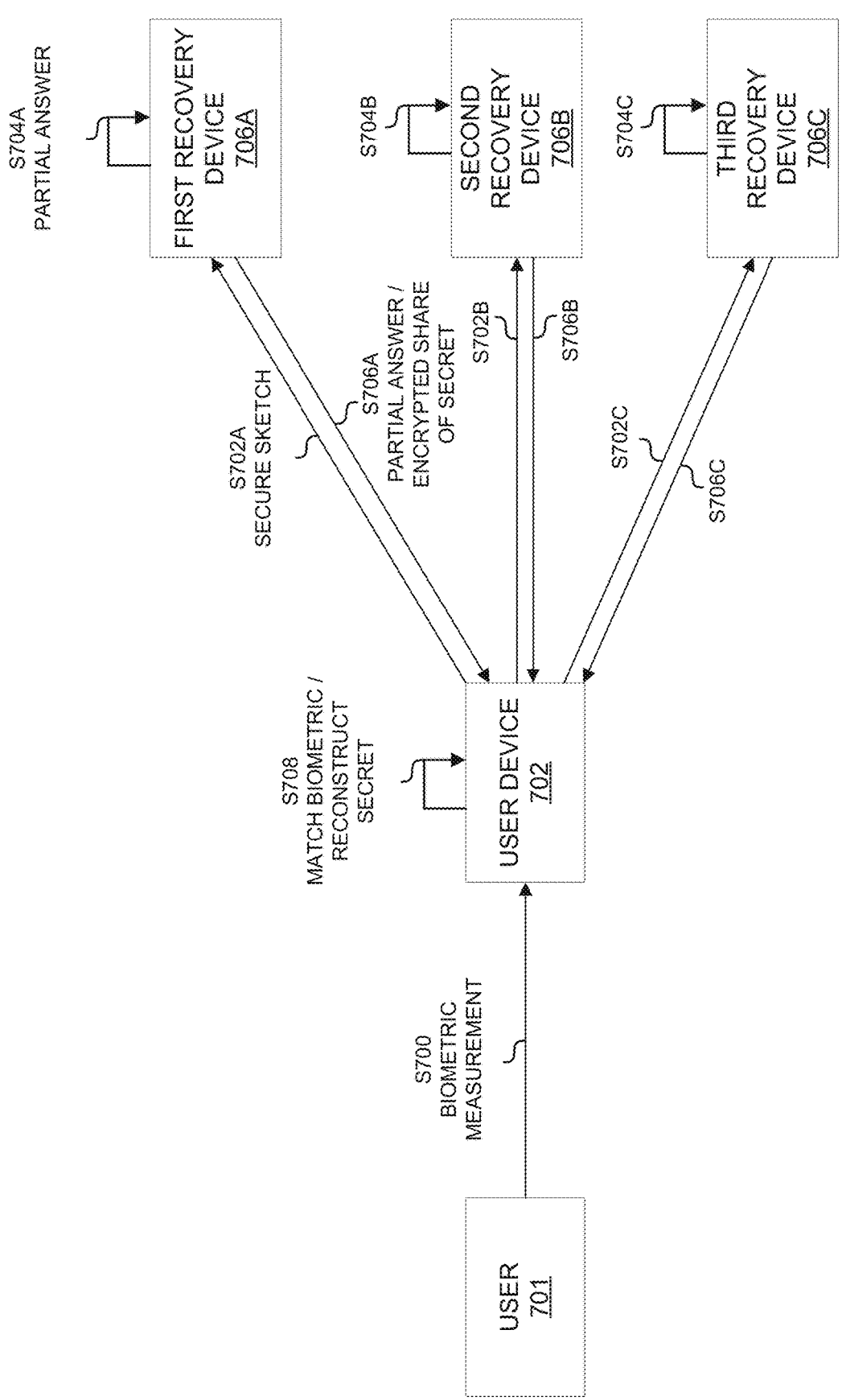
FIG. 7 shows a block diagram depicting a biometric authentication using a secure sketch and TOPRF according to embodiments of the present invention.

FIG. 7 shows a block diagram depicting a biometric authentication using a secure sketch according to embodiments of the present invention. In some embodiments, a user device 702 may have specified a threshold number of recovery devices 706 needed to reconstruct the secret.

In step S700, the user device 702 measures a biometric of the user 701. The biometric measurement may be the same type of biometric measured during the registration phase in step S200, and a same sensor of the user device 702 can be used.

In step S702A-C, the user device 702 applies a secure sketch on the biometric measurement. The following process is similar to the process of applying a secure sketch to the biometric template seen in the description of FIG. 3. For example, the user 701 may provide a biometric measurement (e.g., a fingerprint, etc.) to the user device 702 that the user device 702 may then apply a secure sketch to generate a password pwd (e.g., a string representation of the biometric measurement). The user device 702 may generate a hash h(pwd) of the password. For example, the user device 702 may hash the password using, for example a TOPRF. In some implementations, the user device 702 may blind the hashed password to create a blinded hash of the hashed password h'(pwd). For example, the hash may be blinded by raising to a power of a random value R (e.g., h'(pwd)=h (pwd)$^R$). The user device 702 may then transmit the blinded hash of the hashed password or the hashed password and an identifier associated with the user device 702 to each of the recovery devices 706A, 706B, and 706C.

In step S704A, the first recovery device 706A, may compute a partial answer $p_A$ (e.g., a partial hash response) using the share of the secret $sk_A$ it received during registration using the same algorithm used during the registration phase. For example, if during the registration process, the blinded hash was raised to the power of the server's secret share, the partial answer will again be computed by raising the blinded hash provided in step S702 by the share of the secret held by the first recovery device 706A (e.g., p=h' (pwd)$^{R*skA}$). The first recovery device 706A additionally encrypts the share of the secret $sk_A$ with the hash portion $h_A$ stored during registration (e.g., the hash portion $h_A$ the first recovery device 306A receives in S310A of FIG. 3). A similar step may be performed by the second recovery device 206B and the third recovery device 206C.

In steps S706A-C, the recovery devices 706A, 706B, and 706C send the partial answer and the encrypted share of the secret to the user device 702.

In step S708, after receiving partial answers from at least the threshold number of recovery devices, the user device may perform a biometric authentication. If the password generated in step S300 and S702 are the same (e.g., the first biometric measurement, corresponding to the biometric template, and the second biometric measurement match), the partial answers received as a result of step S706 correspond to the hash portion $h_i$ stored by the recovery devices. Thus, the partial answers may be used as decryption keys if and only if the biometrics provided during registration and in step S700 are the sufficiently similar. The partial answers then can be used to decrypt the encrypted secret shares. After decryption at least a threshold number of shares, the user device 702 may then begin to reconstruct the secret. For example, the user device 702 may use the Combine( )function of a TOPRF as described in section II.B.2. to reconstruct the secret.

1. Protocol Using Secure Sketches

Secure sketches are fundamental building blocks of fuzzy extractor. Combining any information theoretic secure sketch with any threshold oblivious PRF a protocol is constructed. Due to the information theoretic nature of secure sketch this protocol has a distinct feature, that is the probability of succeeding in an offline attack stays the same irrespective of the computational power of the attacker or the number of brute-force trials. However, if a party initiates the protocol with a "close" measurement it recovers the actual template, also due to the same reason the template can not be completely hidden. In other words, this protocol has an inherent leakage on the template incurred by the underlying secure sketch instantiation. The first distinct characteristic is captured under the definition of setting the functions $L_c$ to return the correct template and $L_f$, $L_m$ to return $\perp$ on all inputs. To capture the leakage from template a new query to the ideal functionality is introduced. Consider another extra parameter, the leakage function $L_{tmp}: \mathbb{Z}_q^\ell \to \{0, 1\}^\beta$. On receiving a query of the form ("Leak on Template", sid, $\mathcal{P}_i$) from $\mathcal{S}$, first check whether there is a tuple (sid, $\mathcal{P}$, $w_i$) recorded, if it is not found then do nothing, otherwise reply with ("Leakage", sid, $\mathcal{P}$, $L_{tmp}(w_i)$) to $\mathcal{S}$.

The protocol below realizes the functionality described in FIG. 7 with some reasonable leakage. For simplicity the protocol is presented only with proofs for security against semi-honest adversary, but adding generic NIZK proofs it is possible to make it secure against malicious adversary.

In the Setup phase, the following algorithms are executed by a trusted authority:

Run the TOPRF setup ($[[sk^{OP}]], pp^{OP}$)←TOPRF. Setup $(1^\lambda, n, t)$.

Compute ($pp^{TS}, vk^{TS}, sk_1^{TS}, \ldots, sk_n^{TS}$)←TS. Gen($1^{\lambda, n, k}$).

For each $i \in [n]$, give ($pp^{TS}, vk^{TS}, sk_i^{TS}, sk_i^{OP}, pp^{OP}$) to party $P_i$.

In a registration phase (e.g., FIG. 3), party $P_i$ interacts with all other parties (e.g., recovery devices) to register its own template:

Sample a random vector $w \in \mathbb{Z}_q^\ell$ from the distribution W.

Run the TOPRF encoding to generate c←TOPRF. Encode (w, rand) for some randomness rand and send c to everyone.

Each party $P_j$ (j≠i) replies back with their respective toprf evaluations $z_i$: =TOPRF. Eval($sk_j^{OP}$, c).

Party $P_i$ on receiving at least t−1 responses from parties in some set (say) S, combine them to compute h:=TOPRF. Combine (w, $\{j, z_j\}_{j \in S \cup \{i\}}$, rand).

Party $P_i$ computes keys $K_j$:=H(h,j) for all $j \in [n]$.

Party $P_i$ also computes s←Sketch(w).

Party $P_i$ sends the pair ($K_j$,s) to each party $P_j$ for all $j \in [n]$.

In the sign on phase (e.g., FIG. 7), party $P_i$ that uses an input vector u and a message m on which it wants a token. $P_i$ picks a set S of t−1 other parties $\{P_j\}_{j \in S}$ and $P_k$ and interacts with them in the below four round protocol:Output Computation: On receiving all tuples ($z_j$, $ct_j$) from parties $\{P_j\}_{j \in [S]}$ (a) $P_i$ combines the TOPRF as z←TOPRF. Combine(w, $\{j, z_j\}_{j \in S}$, rand);

(b) and then compute $K_j$:=H(z,j);

(c) decrypt each $ct_1$ using $K_j$ to recover all the partial signatures $\sigma_j$.

(d) combine the partial signatures to obtain the token Token and output that

The token may be verified given a verification key $vk^{TS}$, message m and token Token, the token verification algorithm outputs 1 if TS. Verify($vk^{TS}$, m, Token) outputs 1. If the token is sucessfully verified the token itself holds the secret.

V. Process for Storing and Reconstructing a Secret

Methods described allow a user operating a user device to register a secret and a biometric with a plurality of recovery devices. An account device may facilitate the exchange of data between the user device and recovery devices. The account device generates a recovery agreement, containing necessary information to authorize a recovery request. The user device may, at any time after a recovery agreement is digitally signed by all relevant devices, generate a recovery request to invoke the recovery agreement to recover the user's secret. After the recovery request is authorized, the user device may measure a biometric of the user and authenticate it (e.g., compare it to) the biometric that was stored during registration. If the two biometrics are sufficiently similar, the user device may request shares of the secret from the recovery device which may be used to reconstruct the secret.

Figure 8:
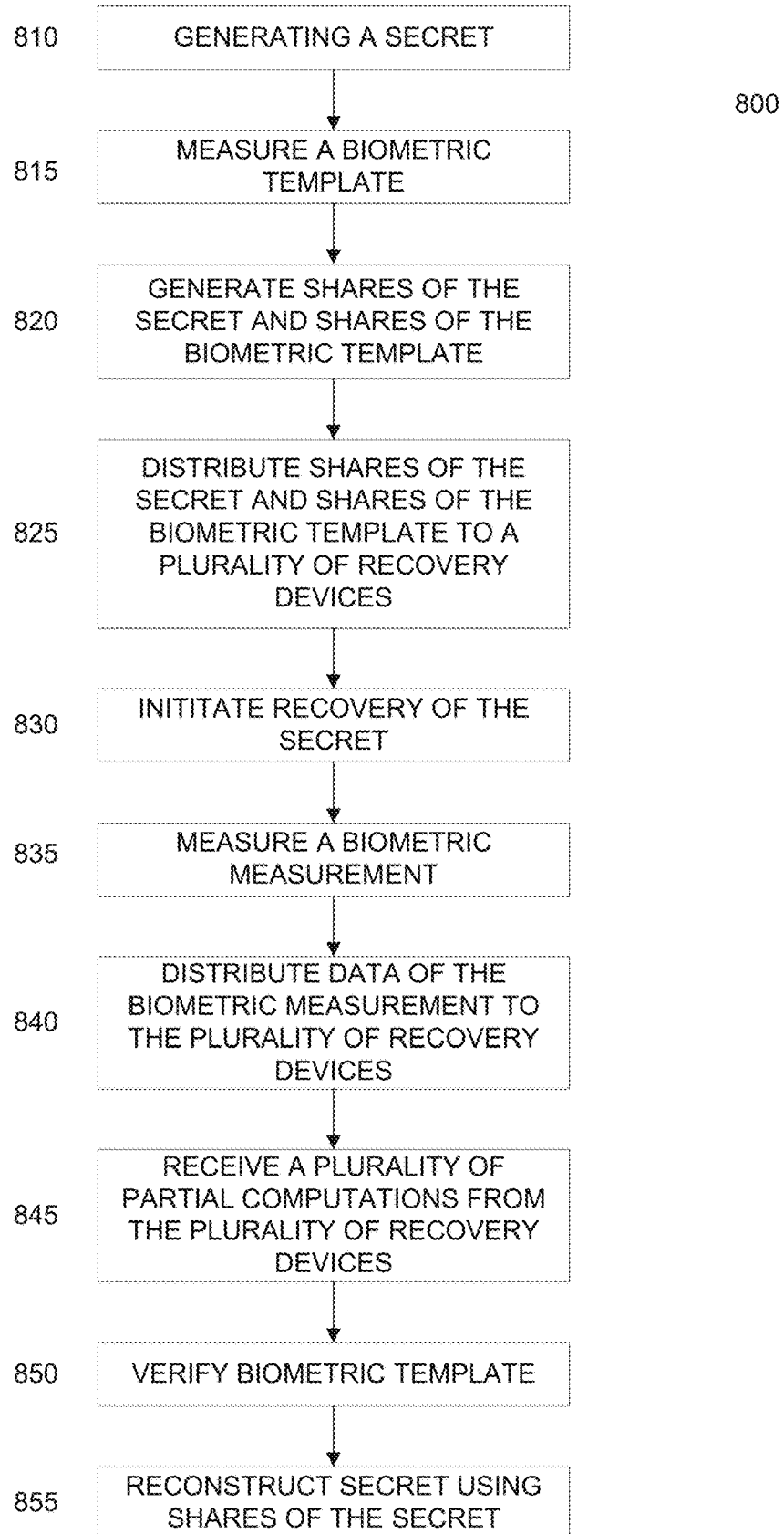
FIG. 8 shows a method for storing and reconstructing a secret according to embodiments of the present invention.

FIG. 8 shows a method 800 for storing and reconstructing a secret according to embodiments of the present invention.

At block 810, a user may generate a secret, such as a cryptographic key or account password. The secret may be used to access an electronic resource such as an account managed by an account device.

At block 815, the user may use a user device to measure a biometric template, such as a fingerprint, a facial scan, a voice recording, etc. The biometric template comprises measured values of the set of biometric features of the user. In some embodiments, the user device may apply a secure sketch to the biometric template to receive a password (e.g., a password may be a string representation of the biometric template). Further, the user device may hash and blind the password to generate a blinded hash of the password.

At block 820, the user device may generate shares of the secret and shares of the biometric template. The shares may be generating using any suitable secret sharing technique. Examples of secret sharing techniques include Shamir's secret sharing and the use of a threshold oblivious pseudorandom function. The secrets may be generated such that, from a total of n shares, any number t<n of the shares may be used to reconstruct the secret.

At block 825, the user device may distribute the shares of the secret and the shares of the biometric template to a plurality of recovery devices. An account device may be used to facilitate exchange of data between the user device and the plurality of recovery devices. The account device may generate a recovery agreement, which may be invoked by the user in order to recover the secret at a later time. In some implementations, after both a share of the secret and a share of the biometric template is received by a recovery device, the recovery device may generate a partial answer. The partial answer may be generated by raising the blinded hash of the password to the power of the shares of the secret. The partial answer may be transmitted by the recovery devices back to the user device to be deblinded to generate a hash portion of the biometric template which will be sent to the recovery device.

At block 830, the user device may initiate recovery of the secret. For example, the user device may generate a recovery request to be sent to the account device. The recovery request will be authorized by retrieving a recovery intent token contained in a recovery agreement that may be authorized by the plurality of recovery devices. After all of the plurality of recovery devices confirm they authorize the recovery request, the user may begin to recover their secret.

At block 835, the user may begin recovery of the secret. The recovery begins with a biometric authentication, in which the user uses the user device to measure a biometric measurement. The user device may then encrypt the biometric measurement. In some implementations, the user device may split the biometric measurement into shares, similarly to what was done at block 820. In other implementations, the user device may apply a secure sketch to the biometric measurement to receive a password of the biometric measurement. The user device may then hash and blind the password of the biometric measurement.

At block 840, the user device may distribute data of the biometric measurement to the plurality of recovery devices. For example, the user device may distribute the encrypted biometric measurement, shares of the biometric measurement, or the blinded hash of the password of the biometric measurement to the plurality recovery devices.

At block 845, the user device may receive partial computations from the plurality of recovery devices. For example, each one of the plurality devices may compare the data of the biometric measurement received to the shares of the biometric template stored during registration. The partial computation may be a comparison between the biometric measurement and the biometric template. As an example, the partial computation may determine if the biometric template and the data of the biometric measurement match by computing the inner product between the biometric template and the data of the biometric measurement. In some implementations, the recovery devices may raise the blinded hash of the password of the biometric measurement to the power of the share of the secret stored during registration to receive a partial answer of the biometric measurement. Additionally, the recovery device may encrypt the share of the secret with the partial answer and transmit both the partial answer and the encrypted share of the secret to the user device.

At block 850, the user device may verify the biometric template. For example, the user device may use properties of a threshold fully homomorphic encryption scheme to combine the partial computations received. The combination of the partial computation may be compared to a threshold matching value to determine if the biometric template and the biometric measurement match. In some implementations, the user device may deblind the partial answer of the biometric measurement to receive a hash portion of the biometric measurement. The hash portion of the biometric measurement and the hash portion of the biometric template match if the associated biometrics match.

At block 855, the user device may reconstruct the secret using shares of the secret. For example, after determining the biometric template and the biometric measurement match, the user device requests shares of the secret from the recovery devices. In some implementations, the hash portions of the biometric measurement may be used to decrypt the encrypted shares of the secret. After receiving a threshold number of shares of the secret, the user device may use properties of the threshold oblivious pseudorandom function, or other secret sharing schemes, to reconstruct the secret.

VI. Computer System

Figure 9:
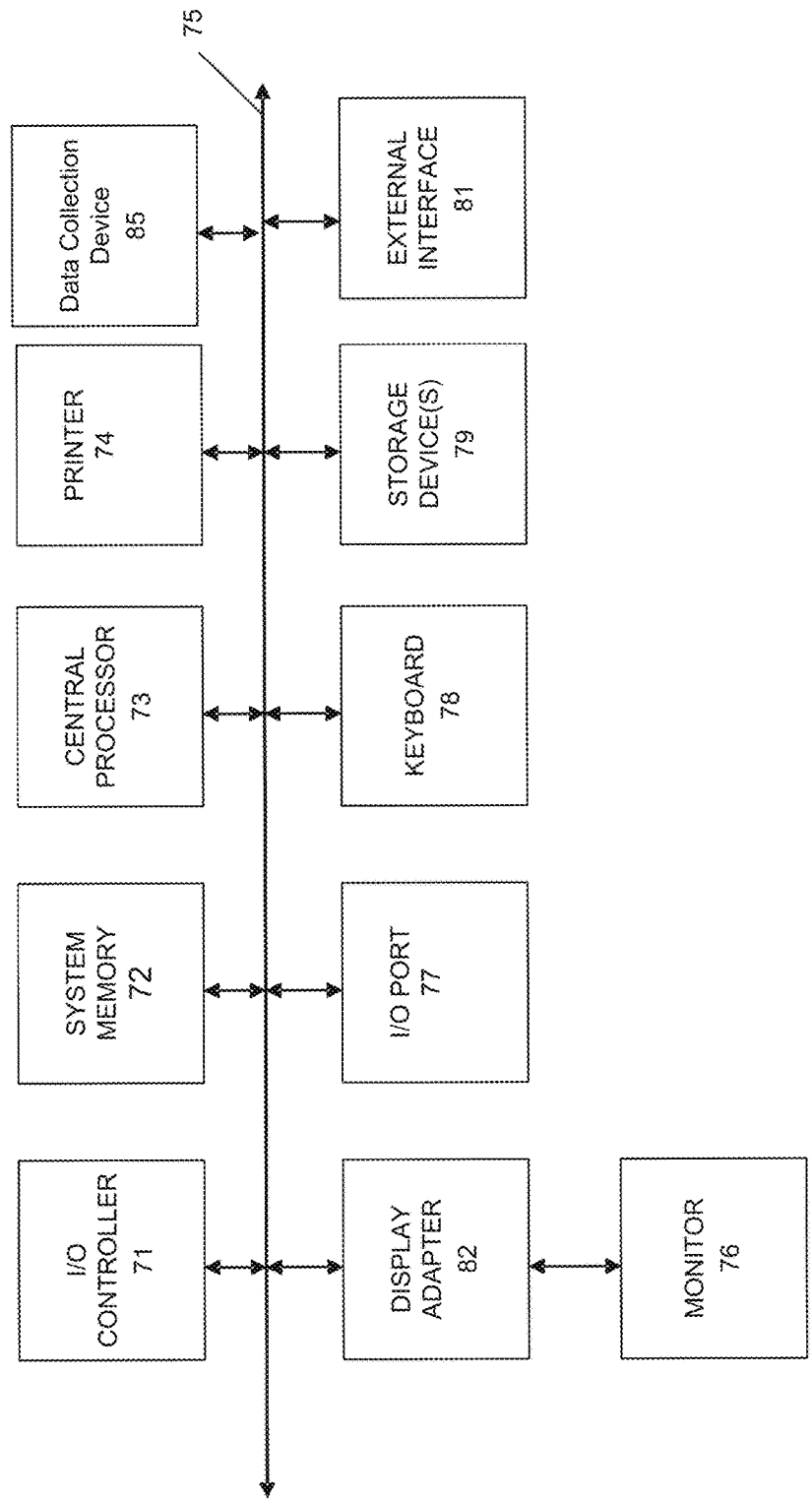
FIG. 9 shows a block diagram of an example computer system usable with systems and methods according to embodiments of the present invention.

Any of the computer systems mentioned herein may utilize any suitable number of subsystems. Examples of such subsystems are shown in FIG. 9 in computer apparatus 900. In some embodiments, a computer system includes a single computer apparatus, where the subsystems can be components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 9 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array)

and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising performing, by a user device:
   generating a secret that is used to access an electronic resource;
   measuring, by a sensor of the user device, a biometric template of a user operating the user device, the biometric template comprising a template vector;
   generating a plurality of secret shares of the secret;
   generating a plurality of biometric template shares of the biometric template;
   distributing, to each of a plurality of recovery devices, one or more of the plurality of secret shares of the secret and one or more of the plurality of biometric template shares of the biometric template;
   receiving a request to initiate a recovery of the secret;
   measuring, by the sensor of the user device, a biometric measurement of the user operating the user device, the biometric measurement comprising a measurement vector;
   transmitting data of the biometric measurement to each of the plurality of recovery devices;
   receiving, from each of the plurality of recovery devices, a plurality of partial computations determined based on the measured biometric measurement of the user and the biometric template shares of the biometric template, wherein each of the plurality of partial computations comprises a similarity measure share of the measured biometric measurement of the user and a respective biometric template share;
   verifying that the biometric template and the biometric measurement match using the partial computations of the plurality of recovery devices, wherein the biometric template and the biometric measurement match when a total similarity measure of the similarity measure shares are within a threshold value;
   responsive to verifying the biometric template and the biometric measurement match, receiving the secret shares of the secret from the plurality of recovery devices; and
   reconstructing the secret using the secret shares.

2. The method of claim 1, wherein the user assigns a cost amount to each of the secret shares.

3. The method of claim 2, wherein the cost amount is used as a weight for the generation of the secret shares.

4. The method of claim 1, wherein verifying the similarity of the biometric template and the biometric measurement comprises:
   summing, the plurality of partial computations;
   calculating, an inner product between the sum of the partial computations and the measurement vector; and
   determining, a result of the inner product is below a threshold value.

5. The method of claim 1, wherein generating a plurality of secret shares of the secret further comprises:
   selecting a threshold number of secret shares that are necessary to reconstruct the secret.

6. The method of claim 1 further comprising, after distributing shares of the secret to the plurality of recovery devices:
   transmitting, by the user device to an account device, a data packet comprising an identifier associated with the user, an identifier associated with the account device, a total number of recovery devices, a list comprising an identifier associated with each of a plurality of recovery entities operating one of the plurality of recovery devices, a recovery intent token, and a recovery authorized token;

transmitting, by the user device to the account device, a recovery request comprising an identifier associated with the user; and as a response to transmitting the recovery request to the account device, receiving the recovery authorized token.

7. The method of claim 6, wherein the account device further operates a blockchain.

8. The method of claim 1, wherein after measuring, by the sensor of the user device, the biometric template of the user operating the user device the method further comprises:

applying a secure sketch to the biometric template to receive a string representation of the biometric template; and after measuring, by the sensor of the user device, the biometric measurement of the user operating the user device:

applying a secure sketch to the biometric measurement to receive a string representation of the biometric measurement; and hashing the string representation of the biometric template and the biometric measurement.

9. The method of claim 8, wherein the method further comprises, after hashing the string representation:

blinding, the string representation of the biometric template; and blinding, the string representation of a biometric vector.

10. The method of claim 8, wherein the string representation is hashed with a threshold oblivious pseudorandom function, wherein the threshold oblivious pseudorandom function comprises a two-party setting where a first party holds a first key and a second party holds an input.

11. The method of claim 1, wherein transmitting data of the biometric measurement comprises:

generating a plurality of biometric measurement shares from the measurement vector; and distributing, to each of the plurality of recovery devices, the plurality of biometric measurement shares.

12. The method of claim 1, wherein reconstructing the secret can be performed after receiving a threshold number of secret shares.

13. The method of claim 1, wherein the user device is a mobile device.

14. The method of claim 1, wherein the user device performs a key reconstruction process using a threshold oblivious pseudorandom function.

15. The method according to claim 1, wherein hash portions of the biometric measurement are used to decrypt encrypted shares of the secret.

16. The method according to claim 1, wherein the similarity measure between the biometric template and the biometric measurement is a cosign similarity.

17. A user device comprising:
a processor;
a plurality of biometric sensors; and
a non-transitory computer readable medium comprising code executable by the processor to perform operations including:
generating a secret that is used to access an electronic resource;
measuring, by a sensor of the user device, a biometric template of a user operating the user device, the biometric template comprising a template vector;
generating a plurality of secret shares of the secret;
generating a plurality of biometric template shares of the biometric template;
distributing, to each of a plurality of recovery devices, one or more of the plurality of secret shares of the secret and one of more of the plurality of biometric template shares of the biometric template;
receiving a request to initiate a recovery of the secret;
measuring, by the sensor of the user device, a biometric measurement of the user operating the user device, the biometric measurement comprising a measurement vector;
transmitting data of the biometric measurement to each of the plurality of recovery devices;
receiving, from each of the plurality of recovery devices, a plurality of partial computations determined based on the measured biometric measurement of the user and the biometric template shares of the biometric template, wherein each of the plurality of partial computations comprises a similarity measure share of the measured biometric measurement of the user and a respective biometric template share;
verifying that the biometric template and the biometric measurement match using partial computations of the plurality of recovery devices, wherein the biometric template and the biometric measurement match when a total similarity measure of the similarity measure shares are within a threshold value;
responsive to verifying the biometric template and the biometric measurement match, receiving the secret shares of the secret from the plurality of recovery devices; and
reconstructing the secret using the secret shares.

18. The user device of claim 17, wherein the user device performs the operations using a threshold oblivious pseudorandom function and wherein generating a plurality of secret shares of the secret further comprises:
selecting a threshold number of secret shares that are necessary to reconstruct the secret.

19. The user device of claim 17, wherein the plurality of biometric sensors can perform biometric measurements of at least one of a facial scan, an iris scan, an ear scan, a fingerprint scan, and a voice recording.

20. The user device of claim 17, wherein after distributing shares of the secret to the plurality of recovery devices, the user device further performs operations including:
transmitting, by the user device to an account device, a data packet comprising an identifier associated with the user, an identifier associated with the account device, a total number of recovery devices, a list comprising an identifier associated with each of the plurality of recovery entities operating one of the plurality of recovery devices, a recovery intent token, and a recovery authorized token;
transmitting, by the user device to the account device, a recovery request comprising an identifier associated with the user; and
as a response to transmitting the recovery request to the account device, receiving the recovery authorized token.

* * * * *